UNITED STATES PATENT OFFICE

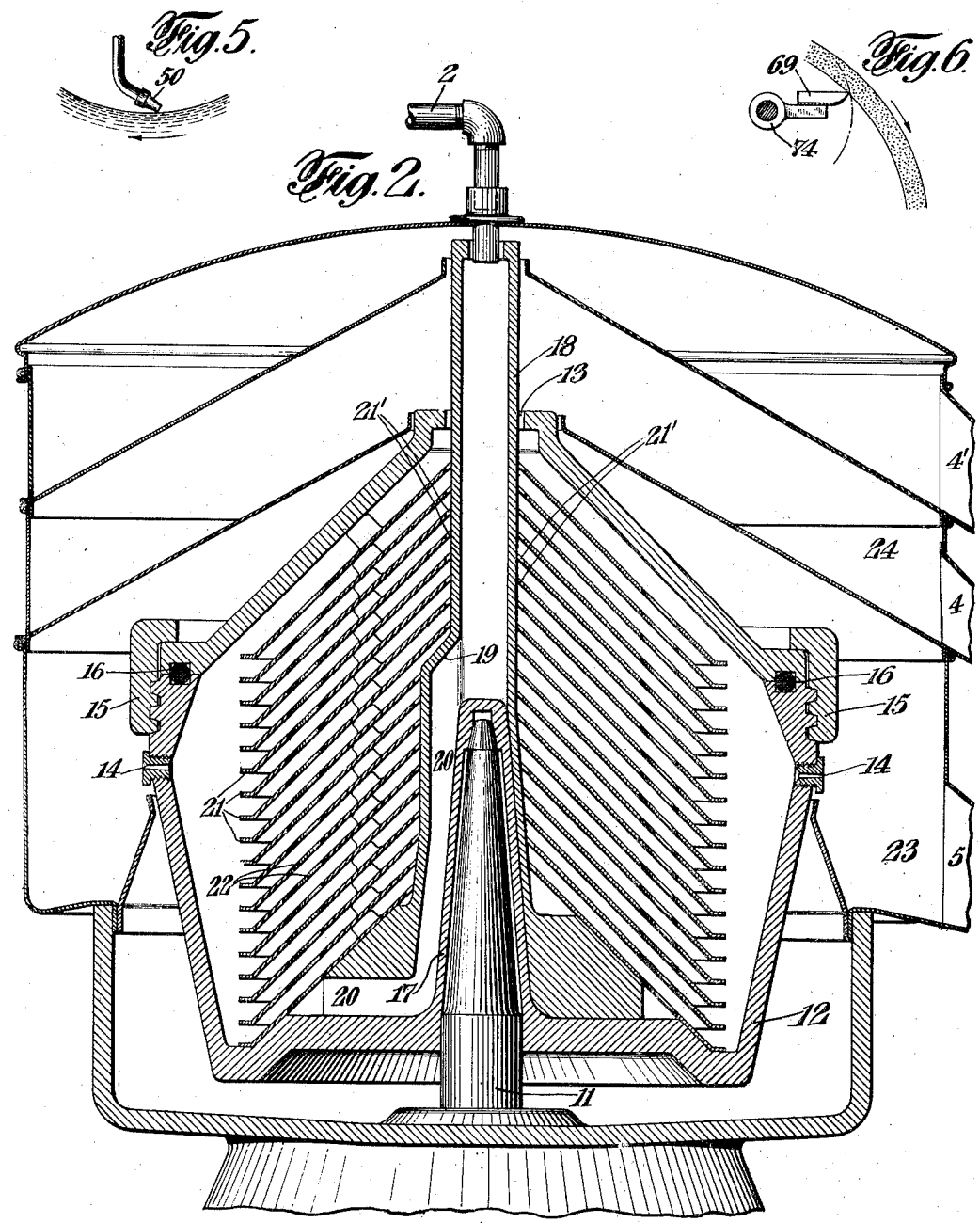

LAURENCE P. SHARPLES, OF CHESTER, PENNSYLVANIA, ASSIGNOR TO THE SHARPLES SPECIALTY COMPANY, OF PHILADELPHIA, PENNSYLVANIA, A CORPORATION OF DELAWARE

SEPARATION OF MIXTURES

Application filed November 16, 1927. Serial No. 233,607.

This invention relates to the separation of mixtures into their constituents, and particularly to the separation of mixtures of solids with liquids into a final solid component substantially free of liquid and a final liquid component substantially free of solid.

Many mixtures of solids with liquids, and particularly such mixtures which contain a small proportion of solid matter, cannot be rapidly separated mechanically, in a single separating operation or in a plurality of similar separating operations successively carried out, into solid and liquid components substantially free from each other.

I have found that many such mixtures of liquid with solid particles can be mechanically separated in a single separating operation into two components, one of which contains a first constituent of the mixture in a state in which it is substantially free of the second constituent, and the other of which contains all or substantially all of the second constituent but also contains an undesirable proportion of the first constituent. Thus, I have found, on the one hand, that mixtures of liquid with solid which cannot be completely and rapidly separated mechanically into liquid and solid constituents substantially free from each other in a single separating operation, can be mechanically separated rapidly into a component consisting of clear or substantially clear liquid and a component containing all or substantially all of the solid and an undesirable proportion of liquid; and I have found, on the other hand, that some such mixtures can be mechanically separated in a single separating operation into a component comprising solid matter substantially free of liquid and a component comprising all or substantially all of the liquid and an undesirable proportion of solid.

I have also found that mixtures of liquid with solid, which cannot be separated into solid and liquid components substantially free of each other in a single mechanical separating operation or in a plurality of similar separation operations successively carried out, can be separated into solid and liquid constituents free or substantially free from each other, by subjecting the mixture to a separation that produces one constituent in a desirably pure state and a second constituent admixed with an undesirable quantity of the first constituent, then subjecting the component that comprises such a mixture to a separating operation that produces the second component in a desirably pure state and a quantity of the first component containing an undesirable proportion of the second constituent, and then returning the impure first constituent, that is obtained in the second separating operation, to the first separating operation from which the first constituent is being obtained in a pure state. Thus, in accordance with my invention all of the original mixture is separated into its constituents and both constituents of the mixture are nevertheless obtained in a state in which they are substantially free from each other.

More specifically, in the practice of my invention a mixture of liquid with solid matter may be rapidly separated mechanically into a component comprising solids substantially free of liquid and a component comprising liquid substantially free of solid, by two mutually cooperating separating operations acting complementarily. Thus, such a mixture which cannot be separated into its pure components in a single mechanical operation or in repeated similar operations is subjected to centrifugal separation that gives pure or substantially pure liquid as one component and gives solid matter containing an undesirable quantity of liquid as the other component, then the solid containing an undesirable quantity of liquid is subjected to a centrifugal separation that gives as one component solid matter substantially free of liquid and gives as the other component liquid containing an undesirable amount of solid, and then the component that consists of liquid containing an undesirable quantity of solid is carried back to the first centrifugal separation that is discharging pure or substantially pure liquid. Thus all of the original mixture and all components of separation which consist of mixtures are ultimately resolved into pure or substantially pure solid matter and pure or substantially pure liquid. Within the spirit of my invention the order of the centrifugal separations may be reversed.

In the practice of my invention one of the separations may be carried out in a centrifugal machine that discharges a major portion of the liquid in a pure state, on the one hand, and discharges solid matter, perhaps through orifices, in a state in which it contains enough liquid to flow, on the other hand. The other separating operation may be carried out in a centrifugal machine in which a cake of solid is formed from which the liquid is centrifugally expelled, such a cake being formed by subsidence in one form of centrifugal machine and thereafter centrifugally drained, or such a cake being formed by mere draining in another form of centrifugal machine. The types of centrifugal machines may be selected in accordance with the particular requirements imposed by the character of the substances being separated. In fact, an important advantage of my invention is that the disadvantages or defects of centrifugal machines that are admirably suited to a particular purpose are eliminated by the co-operative employment of such machines in accordance with my invention. Thus, clear liquid is best obtained from a mixture by a high speed centrifugal machine that is incapable of either discharging solids in a liquid-free state or retaining such solids in any considerable quantity. And, other machines well adapted to the formation of a cake of solid that is substantially liquid-free are incapable of discharging liquid in a solid-free state. But, by using such machines in a cooperative relation in accordance with my invention, the best features of such machines are utilized and the disadvantages or defects thereof are no longer a problem.

From a specific point of view, my invention contemplates the employment of two centrifugal operations one of which produces one constituent in a desirably pure state and the other of which produces the other constituent in a desirably pure state, the separations being conducted with such mutual co-operation that impure effluents from one separating operation are returned to the other separating operation with the result that the original mixture and all impure effluents are ultimately separated into pure or substantially pure solid and liquid components.

By the practice of my invention it is possible to resolve into a substantially liquid-free solid component and a substantially solid-free liquid component, many mixtures that are incapable of being resolved into such components rapidly in a single mechanical operation or in a plurality of similar operations successively carried out; and for the purpose of more fully identifying the characteristics of mixtures capable of being so separated in the practice of my invention, but with the understanding that my invention is not limited thereto, I point out that by the practice of my invention it is possible to so separate protein from malt extract, yeast solids from beer, and solids from sludge formed in the production of alcohol by fermentation from black strap molasses.

For the purpose of assisting in the understanding and in the practice of my invention I describe in connection with the accompanying drawings, with the understanding that my invention is not limited to the use or details thereof, apparatus embodying my invention and whereby my process may be practised.

In the drawings, in which like reference characters indicate similar parts,

Fig. 2 is a vertical sectional view, with parts broken away, of a centrifugal separator embodied in the apparatus shown in Fig. 1 and whereby a mixture of solids with liquids may be separated into a substantially solid-free liquid constituent and a constituent containing substantially all of the solids and some of the liquid;

Fig. 5 is a fragmentary detailed view, and

Fig. 6 is a fragmentary sectional view on line 6—6 of Fig. 3.

Figure 1:
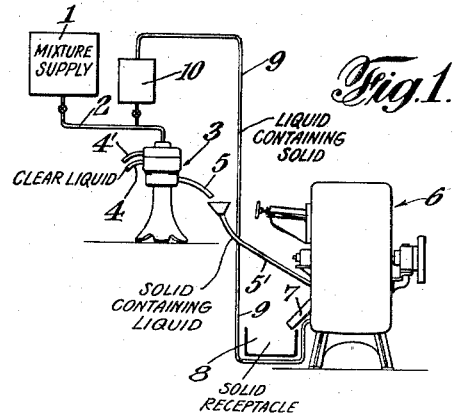
Fig. 1 is a diagrammatic view of apparatus embodying my invention and whereby my invention may be practiced.

Referring to the drawing a mixture to be separated may be contained in a supply tank 1 from which it is fed by pipe 2 to a centrifugal separator 3 in which it is separated into a liquid component discharged from spout 4 that is substantially free of solid material and a second component discharged from pipe 5 that contains substantially all of the solid material and an undesirable percentage of liquid. The mixture discharging through pipe 5 is conducted in any suitable manner as by pipe 5' to a second centrifuge 6 that is capable of separating the mixture into a component consisting of solid material substantially free of liquid and a second component consisting of liquid containing some solid matter. While the substantially liquid-free solid may be retained within the rotor as a cake, it may in some types of machines be discharged at some time during the rotation of the bowl through a hopper 7 into a receiver 8 for solid matter. The liquid containing solid is discharged from centrifuge 6 through pipe 9 and may be passed in any suitable way as by tank 10 back into the inlet pipe 2 of the centrifuge 3 which is discharging substantially solid-free liquid as one of the components of its separation.

From the foregoing it will appear that the final constituents are pure or substantially pure liquid discharged through spout 4 and pure or substantially pure solid matter collected in receptacle 8. It will also appear that in such apparatus it is possible to employ a separator well adapted to the withdrawal of pure liquid from a mixture of solids with liquid but possibly incapable of retaining the solid matter or discharging it in a liquid-free state and it is possible to employ a centrifuge that is well adapted to the formation of a cake of liquid-free solid although incapable of discharging solid-free liquid. Thus desirable features of existing machines may be taken advantage of while the disadvantages of the defects of such machines are avoided. It will also be apparent that by the apparatus described it is possible to resolve into pure constituents in accordance with my invention a mixture of liquids with solids that cannot be separated into pure constituents in a single mechanical operation or by a repetition of similar mechanical operations. Spout 4' discharges overflow of mixture.

There are various types of centrifuges capable of carrying out the different kinds of separation involved in apparatus embodying my invention and whereby my process may be practised. For example, substantially solid-free liquid may be obtained by the centrifugal machine shown in Fig. 2. In that machine a spindle 11 supports a bowl 12 from which substantially solid-free liquid is discharged over the weir 13 and solids containing liquid are discharged through orifices 14. The bowl 12 may comprise two parts joined and sealed in any known manner as by nut 15 and gasket 16. The spindle 11 is rotated in any suitable manner at a high speed, e. g., several thousand R. P. M., and fits into hub 17 of bowl 12. Feed tube 18 fits over the hub 12, resting on the bottom of the bowl, and is provided with three distended portions 19 (only one of which appears in Fig. 2) which provide feed channels 20 alongside of hub 17. Within the bowl there is advantageously positioned a liner of well known construction and consisting of a series of frusto-conical disks 21 having openings 22 located adjacent the outlet end of the supply passages 20, and liquid notches 21' at their inner edges.

In the operation of the construction shown in Fig. 2 original mixture supplied through pipe 2 or solid-containing effluent from centrifugal machine 6 introduced through pipe 9 will pass down through supply tube 18 and through supply passages 20. Under the action of centrifugal force solid material will move to the outer portion of the interior of the bowl and solids containing some liquid will be discharged through orifices 14, while substantially solid-free liquid will be discharged over the weir 13. Material discharged through orifices 14 will be collected in compartment 23 and pass therefrom through pipe 5 and be carried to centrifuge 6. Liquid discharged over weir 13 will be collected in compartment 24 and pass through spout 4 to any suitable collecting receptacle.

Figure 4:
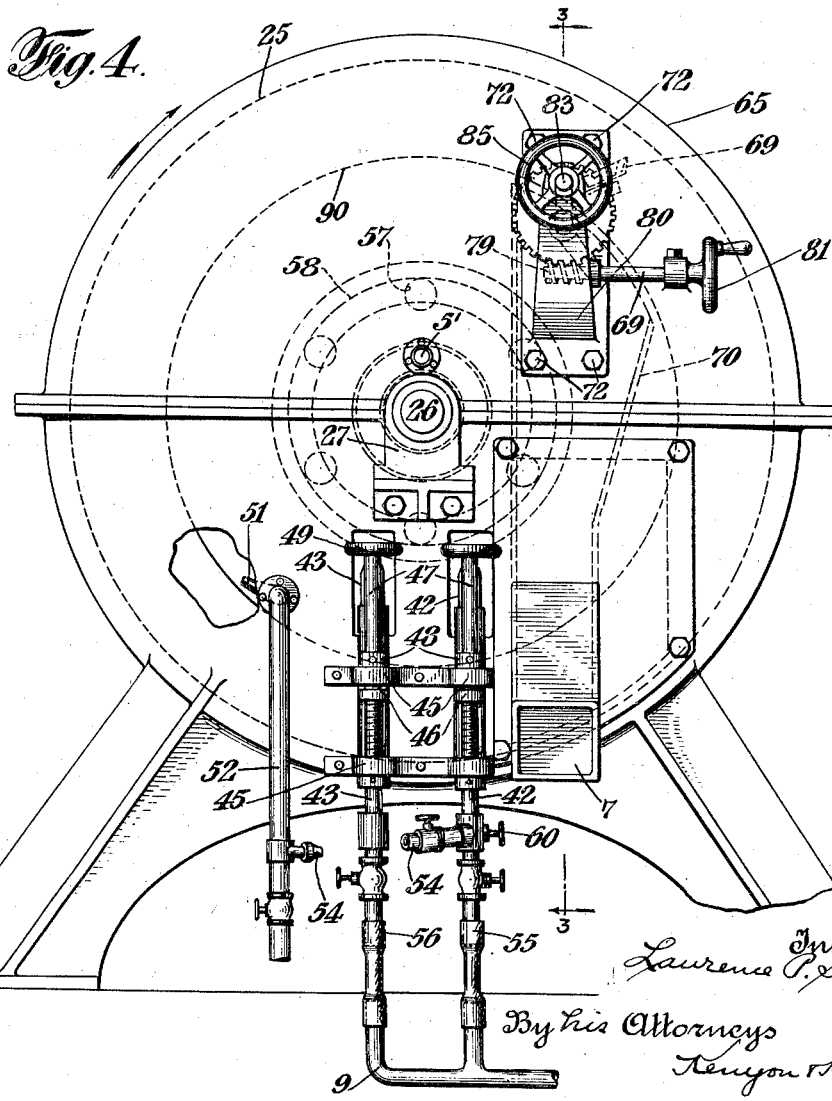
Fig. 4 is a vertical elevation, with parts broken away of the mechanism shown in Fig. 3.
Figure 3:
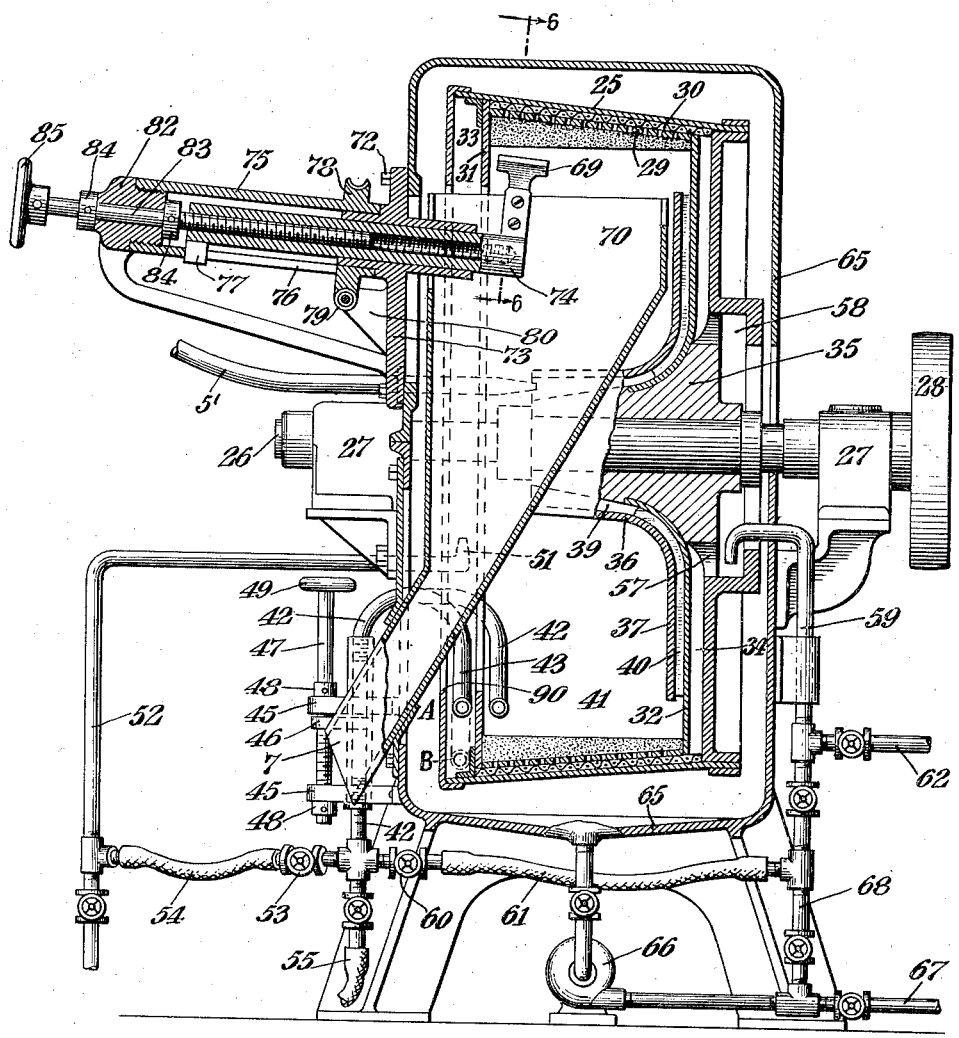
Fig. 3 is a vertical sectional view approximately on line 3—3 of Fig. 4, with parts broken away, of a centrifugal machine embodied in the apparatus shown in Fig. 1 and whereby mixtures of solids with liquid may be separated into a substantially liquid-free solid component and a liquid component containing some of the solids.

There are various types of centrifuges capable of separating mixtures of liquids with solids into a substantially liquid-free solid component and a liquid component containing some solids. Such a centrifuge is illustrated in Figs. 3, 4, 5 and 6. Therein an imperforate centrifugal bowl 25 is mounted for rotation on a shaft 26 that is supported in bearings 27 and is provided with a pulley 28 or similar driving element. Within the bowl 25 and co-axial therewith is a perforated or pervious partition or screen 29 that is spaced from the inner wall of bowl 25 and is held in spaced relation therefrom by a spacing member 30, a convenient form of which is a woven wire screen or fabric, that will permit free flow of liquid between screen 29 and bowl 25. Screen 29 may be of any suitable form so long as it holds back solid particles to desired degree. Within the bowl 25 and spaced from one end thereof is a disk 31 that extends radially inward from partition 29 and forms with the end of bowl 25 a compartment that is usually a liquid compartment 33, which constitutes an auxiliary compartment of the bowl. Within the bowl 25 and spaced from the other end thereof is a partition 32 that extends radially inward from screen 29 and forms with the other end of the bowl a compartment 34. Within the bowl and spaced from hub 35 thereof is a frusto-conical tube 36 having a disk-like portion 37 spaced from partition 32, thereby forming a supply passage 39 within which may be located wings 40 which ensure that the rotation of the bowl will be imparted to substances entering through passage 39. Mixtures of liquid with solid are passed from centrifuge 3 and introduced into supply passage 39 through pipe 5'. Mixture passing through supply passage 39 enters the main separating compartment 41 which lies between partitions 31 and 32 of the bowl. The bowl being imperforate, a cake of solid material is formed by sedimentation or subsidence in compartment 41, and when the solid material is heavier than liquid such cake will rest upon screen 29. A layer of liquid will form that will normally extend radially inward to the edge of partition 31. Liquid may be skimmed from the surface of the liquid in main compartment 41 by skimmer 42 and the supply of mixture and the skimming may proceed until a suitable body of solid particles has been formed in the bowl by centrifugal subsidence. Or, since partition 32 does not engage the inner wall of bowl 25, the liquid will assume the same level in the compartment 33 that it assumes in compartment 41, liquid may be skimmed from compartment 33 by skimmer 43. When a suitable body of solids is so formed in compartment 41 the supply of mixture is stopped and skimmer 43 may be moved successively to radially outward positions thereby withdrawing more liquid from the bowl with the result that the body of solid particles is subjected to centrifugal draining or straining while under the influence of centrifugal force. By making the bowl 25 frusto-conical in form, skimmer 43 will skim liquid from a point radially outward of any part of the body of solids and the cake will be effectively drained.

Adjustability of the radial distance of skimmers 42 and 43 from the bowl axis is attained by mounting the skimmers slidably in brackets 45 and providing them with lugs 46 through which is threaded a shaft 47 that is mounted for rotation in brackets 45 and held against longitudinal motion therein by collars 48. By turning a shaft 47 by means of hand wheel 49, lug 46 is moved longitudinally of the shaft 47 and the skimmer to which lug 46 is attached is adjusted to desired radial distance from the axis. Skimmers 42 and 43 are provided with nozzles 50 and are positioned with respect to the liquid surface as shown in Figure 5, the bowl rotating in the direction of the arrow. Liquid withdrawn from bowl 25 through skimmers 42 and 43 passes into flexible pipes 55 and 56 which lead into pipe 9, which conducts such liquid back to centrifuge 3 if it is not sufficiently free of solid material. If it is desired to wash such a cake after it has been so formed and drained centrifugally, or if it is desired to treat such a cake with suitable liquid, the washing or treating liquid may be supplied by pipe 52 and discharged through nozzle 51 into compartment 43 and withdrawn by skimmer 42 and passed through valve 53 into pipe 54 where it may be passed to storage or further treated as desired. Moreover, liquid withdrawn by skimmer 42 can be passed under control of valve 53 into flexible tube 54 and so introduced into pipe 52 and discharged from nozzle 51. Or, liquid withdrawn by skimmer 42 may be passed under control of valve 60 into flexible tube 61 and led into pipe 68 from which it passes into pipe 59 and is discharged into trough 58 formed on the end of bowl 25. Liquid introduced into trough 58 passes through openings 57 in the end of bowl 25 and into compartment 34 from which it passes to the center portion of the cake through screen 29 and thence radially inward through the cake.

Again, liquid may be discharged over the weir 90 and collected in the casing 65 of the bowl, from which it is withdrawn by pump 66 and passed into pipe 68 or conducted away by pipe 67. By the construction described it is possible to wash the cake under the action of centrifugal force. Washing or treating liquid may be supplied to pipe 59 through pipe 62. Ordinarily liquid removed by skimmer 42 during the building up of the cake will be passed to centrifuge 3 and the draining of the cake will be accomplished by moving skimmer 43 from position A to position B. If liquid is not removed by skimming during the building of the cake it will discharge over weir 90 and in that case liquid withdrawn from casing 65 by pump 66 and discharged through pipe 67 will be returned to centrifuge 3.

To remove a cake or layer of solid particles from the bowl without stopping it an auxiliary tool 69 is so constructed and mounted as to dislodge the solid particles and to cause them to drop into a hopper 70 positioned within casing 65 and extending into bowl 25, the solid particles discharging through spout 7. In the construction shown a tool support 73 extends through an opening in casing 65 and is held in place therein by bolts 72. The tool support 73 comprises a bearing supporting an internally threaded bar 74 on which is mounted tool 69. Surrounding an outward extension of support 73 is a cylindrical member 75 provided with a groove 76 in which slides a lug 77 carried by bar 74, whereby cylindrical member 75 and bar 74 are caused to rotate together and bar 74 is permitted to move longitudinally in member 75. Cylindrical member 75 carries a worm gear 78 that is engaged by a worm 79 mounted in brackets 80 and operated by hand wheel 81. Thus rotation of member 75 will, as shown in Fig. 6, cause tool 69 to swing about the axis of rod 74 and toward and from screen 29 and into engagement with a cake carried thereby. Fitting into the outer end of cylindrical member 75 is a bracket member 82 that is supported from the casing 65, and passing through bracket member 82 is a threaded shaft 83 that is held against axial movement by collars 84 fixed thereto. Shaft 83 is threaded into bar 74 and when rotated by hand wheel 85 tool 69 is caused to move back and forth along the face of the cake in bowl 25.

While I have described my invention in great detail I do not intend that I shall be limited to such details but that it shall include such modifications and variations as fall within the hereunto appended claims. In this connection it is particularly to be noted that considerable variation may be made in the centrifugal machines employed so long as one centrifuge will divide a mixture into a component consisting of one constituent of the mixture in a substantially pure state and a second component consisting of a mixture of the constituents of the original mixture and the other centrifuge produces the other constituent of the mixture in a substantially pure state and if desired also discharges a component consisting of a mixture of the constituents of the original mixture. Thus, it is to be noted that the order in which the centrifuges of different character are used may be reversed; and that the cake of solids is not necessarily removed from bowl 25 during rotation thereof, and if a mixture is first introduced into bowl 25 the liquid withdrawn therefrom may be so pure that solids removed from the liquid in bowl 10 may be retained in bowl 10; and that liquids may be separated from lighter solids in which case the cake will float in bowl 25 and liquid may be withdrawn by skimmer 43, bowl 10 being appropriately selected or modified in such case. The degree to which liquid may be centrifugally removed from solids varies between wide limits dependent largely upon the characteristics of the solid, and references herein to solids substantially freed of liquid include solids freed of liquid substantially so far as known centrifugal methods and apparatus or the centrifugal method and apparatus herein described are capable of removing liquid from solids having the characteristics of the particular solid involved, it being particularly difficult to remove liquid centrifugally from soft solids such as yeast.

I claim:

1. In the separation of mixtures of solids with liquids the process comprising, progressively subjecting the mixture to the influence of centrifugal force and thereby separating it by sedimentation into a substantially pure liquid component and a second component comprising substantially all of the solid constituent of the mixture and some of the liquid, centrifugally discharging said second component continuously from the periphery of the body of substances under the influence of centrifugal force, while separately discharging said first component from the influence of centrifugal force, and subjecting said second component to the influence of centrifugal force and thereby separating it into a substantially liquid-free solid component and a component comprising liquid containing some of the solid.

2. The process of separating, into a substantially liquid-free solid component and a substantially solid-free liquid component, mixtures of solids with liquids which are incapable of continuous separation into such components in a single mechanical operation or in repeated similar operations, which comprises continuously separating the mixture by centrifugal sedimentation into a substantially solid-free liquid component and a second component containing both solid and liquid, and separating said second component by centrifugal draining into substantially liquid-free solid and liquid containing solid.

3. The process of separating, into a substantially liquid-free solid component and a substantially solid-free liquid component, mixtures of solids with liquids which are incapable of continuous separation into such components in a single mechanical operation or in repeated similar operations, which comprises continuously subjecting the mixture to the influence of centrifugal force and thereby continuously separating it by sedimentation into a substantially pure liquid component and a second component comprising substantially all of the solid constituent of the mixture and some of the liquid, centrifugally discharging said second component continuously from the periphery of the body of substances under the influence of centrifugal force, and separating said second component by centrifugal draining into substantially liquid-free solid and liquid containing solid.

4. The process of separating, into a substantially liquid-free solid component and a substantially solid-free liquid component, mixtures of solids with liquids which are incapable of continuous separation into such components in a single mechanical operation or in repeated similar operations, which comprises continuously separating the mixture by centrifugal sedimentation into a substantially solid-free liquid component and a second component containing both solid and liquid, separating said second component by centrifugal sedimentation into a solid component and a liquid component, and then centrifugally draining the liquid from the solid and thereby obtaining the solid component in a substantially liquid-free state.

5. In combination, a first centrifuge of the type wherein a mixture of liquids with solids is separated into a substantially pure liquid component and a second component comprising solids mixed with liquid and having an inlet for mixture and outlets for said components, a second centrifuge of the type wherein a mixture of liquids with solids is separated into a substantially dry solid component and a component comprising liquid containing solid and having an inlet for mixture and a discharge for liquid containing solid, and a connection between the discharge for the second component of the first centrifuge and the inlet of the second centrifuge.

6. In combination, a first centrifuge of the type wherein a mixture of liquids with solids is separated into a substantially pure liquid component and a second component comprising solids mixed with liquid and having an inlet for mixture and a peripheral outlet for said second component, a second centrifuge of the type wherein a mixture of liquids with solids is separated into a substantially dry solid component and a component comprising liquid containing solid and having an inlet for mixture and a discharge for liquid containing solid, and a connection between the discharge for the second component of the first centrifuge and the inlet of the second centrifuge.

7. In combination a first centrifuge having an inlet and having a liquid outlet and having orifices adjacent its periphery for the discharge of mixed solid and liquid, collecting means for substances discharged through said orifices a second centrifuge receiving material collected in said collecting means and having means for withdrawing liquid from an inner zone thereof, and means for conducting to the inlet of said first centrifuge liquid withdrawn from said second centrifuge by said withdrawing means.

8. In combination, a first centrifuge of the type wherein a mixture of liquid with solids is separated by sedimentation into a first component consisting of substantially clear liquid and a second component consisting of solids mixed with liquid and having an inlet for mixture and a discharge for said second component, a second centrifuge of the type wherein a mixture of solids with liquid is separated into a first component consisting of substantially liquid-free solids and a second component comprising solids mixed with liquid and having an inlet for mixture and a discharge for said second component, and a connection between the discharge of said first centrifuge and the inlet of said second centrifuge.

9. In combination, a first centrifuge of the type wherein a mixture of liquid with solids is separated by sedimentation into a first component consisting of substantially clear liquid and a second component consisting of solids mixed with liquid and having an inlet for mixture and a discharge for said second component, a second centrifuge of the type wherein solids are separated from liquid by subsidence and the liquid is withdrawn to drain the solids and produce a component consisting of substantially liquid-free solids and having an inlet and means for withdrawing liquid separated therein from the solids by subsidence, and a connection between the discharge of said first centrifuge and the inlet of said second centrifuge.

In testimony whereof, I have signed my name to this specification.

LAURENCE P. SHARPLES.